United States Patent
Muff et al.

(10) Patent No.: US 9,317,291 B2
(45) Date of Patent: Apr. 19, 2016

(54) LOCAL INSTRUCTION LOOP BUFFER UTILIZING EXECUTION UNIT REGISTER FILE

(71) Applicant: International Business Machines Corporation, Armonk, NY (US)

(72) Inventors: Adam J. Muff, Issaquah, WA (US); Paul E. Schardt, Rochester, MN (US); Robert A. Shearer, Woodinville, WA (US); Matthew R. Tubbs, Issaquah, WA (US)

(73) Assignee: International Business Machines Corporation, Armonk, NY (US)

( * ) Notice: Subject to any disclaimer, the term of this patent is extended or adjusted under 35 U.S.C. 154(b) by 592 days.

(21) Appl. No.: 13/767,456

(22) Filed: Feb. 14, 2013

(65) Prior Publication Data

US 2014/0229710 A1    Aug. 14, 2014

(51) Int. Cl.
*G06F 9/38* (2006.01)
*G06F 9/30* (2006.01)

(52) U.S. Cl.
CPC .............. *G06F 9/38* (2013.01); *G06F 9/30058* (2013.01); *G06F 9/3836* (2013.01)

(58) Field of Classification Search
CPC ... G06F 9/3802; G06F 9/3851; G06F 9/3814; G06F 9/3017; G06F 9/30149; G06F 9/38
See application file for complete search history.

(56) References Cited

U.S. PATENT DOCUMENTS

| | | | | |
|---|---|---|---|---|
| 4,792,892 A | * | 12/1988 | Mary | G06F 9/4426 712/241 |
| 5,392,228 A | | 2/1995 | Burgess | |
| 5,404,473 A | * | 4/1995 | Papworth | G06F 9/30018 712/241 |
| 5,603,037 A | * | 2/1997 | Aybay | G06F 1/3203 713/322 |
| 5,784,640 A | | 7/1998 | Asghar et al. | |
| 6,502,182 B1 | | 12/2002 | Morishima | |
| 6,564,179 B1 | | 5/2003 | Belhaj | |
| 6,886,091 B1 | * | 4/2005 | Vissers | G06F 9/30032 712/215 |
| 8,271,997 B2 | | 9/2012 | Frank et al. | |
| 2009/0113192 A1 | * | 4/2009 | Hall | G06F 9/381 712/241 |

OTHER PUBLICATIONS

U.S. Patent and Trademark Office, Office Action issued in related U.S. Appl. No. 13/796,077 dated Oct. 5, 2015.

* cited by examiner

*Primary Examiner* — Farley Abad
(74) *Attorney, Agent, or Firm* — Middleton Reutlinger

(57) ABSTRACT

A method and circuit arrangement utilize a register file of an execution unit as a local instruction loop buffer to enable suitable algorithms, such as DSP algorithms, to be fetched and executed directly within the execution unit, and often enabling other logic circuits utilized for other, general purpose workloads to either be powered down or freed up to handle other workloads.

8 Claims, 7 Drawing Sheets

LOCAL INSTRUCTION LOOP BUFFER UTILIZING EXECUTION UNIT REGISTER FILE

FIELD OF THE INVENTION

The invention is generally related to data processing, and in particular to processor architectures and controlling power consumption of such architectures.

BACKGROUND OF THE INVENTION

As semiconductor technology continues to inch closer to practical limitations in terms of increases in clock speed, architects are increasingly focusing on parallelism in processor architectures to obtain performance improvements. At the chip level, multiple processing cores are often disposed on the same chip, functioning in much the same manner as separate processor chips, or to some extent, as completely separate computers. In addition, even within cores, parallelism is employed through the use of multiple execution units that are specialized to handle certain types of operations. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

These various techniques for improving execution unit performance, however, do not come without a cost. Parallelism adds complexity, often requiring a greater number of logic gates, which increases both the size and the power consumption of such execution units. Coupling these techniques with the general desire to increase performance through other techniques, such as increased switching frequency, the power consumption of complex, high performance execution units continues to increase, despite efforts to reduce such power consumption through process improvements. Excessive power consumption can present issues for portable or battery powered devices, but more typically, excessive power consumption presents issues for nearly all electronic circuits due to the generation of heat, which often requires elaborate cooling systems to ensure that a circuit does not overheat and fail.

Chip-wide control over power consumption is often used in electronic circuits such as those used in laptop computers or other portable devices, typically by throttling down the clock rate or frequency of the circuit to reduce power consumption and the generation of heat. In addition, power consumption may also be reduced in some instances by temporarily shutting down unused circuits on a chip, including, for example, entire execution units. In all of these instances, however, throttling back the power consumption of the circuit usually results in lower performance in the chip. Furthermore, the circuit characteristics that define the overall power consumption of such circuits, e.g., cycle time, voltage, logic area, capacitance, etc., are most often designed to meet a maximum performance target.

Particularly for complex System on Chip (SOC) designs, increasingly complex logic circuitry is being incorporated into individual chips, and in many instances, it costs more power per bit to move the bit from memory to the central processing unit (CPU), than it does to perform the desired computation. As a result, improved power reduction mechanisms are required for moving data around on, and off, chip. Additionally, many features once unique to digital signal processors (DSPs) are increasingly being implemented on general purpose processors to reduce cost by eliminating the need for separate DSP chips in a system and to increase performance by eliminating the need to move data between a DSP chip and the CPU.

However, many algorithms more traditionally performed by DSPs, e.g., Fast Fourier Transforms (FFT), do not perform as well using traditional general purpose processors or CPUs. Although some features added to more recent general purpose processor designs, e.g., SIMD execution units and predication, have significantly improved performance, the power consumption of general purpose processing units performing these algorithms is still typically much higher than that of DSP chips specifically tailored for those algorithms. This is primarily because general purpose processing units typically incorporate large blocks of logic such as multiple cache memories, multiple threads of execution, multiple execution units, etc. that are intended to improve performance generally for most workloads. However, for many DSP algorithms, this logic does very little to improve performance, and thus the additional power consumption of this logic is often effectively wasted when executing such DSP algorithms in a general purpose processor.

Therefore, a continuing need exists in the art for improved manners of reducing power consumption in an integrated circuit, particularly in connection with executing DSP algorithms and the like.

SUMMARY OF THE INVENTION

The invention addresses these and other problems associated with the prior art by providing a method and circuit arrangement that utilize a register file of an execution unit as a local instruction loop buffer to enable suitable algorithms to be performed directly and efficiently within the execution unit. By utilizing an execution file as a local instruction loop buffer, Instructions may be stored in a register file and fetched, decoded and executed directly from the register file, enabling other logic circuits to either be powered down or freed up to handle other workloads, and thereby reducing power consumption and/or improving overall performance of a processing unit.

For example, in some embodiments, an auxiliary execution unit such as a scalar or vector floating point execution unit may incorporate additional logic to implement a local instruction loop buffer in the register file thereof such that instructions representing a DSP algorithm can be directly fetched and executed out of the register file, rather than an existing instruction cache. By doing so, logic circuits such as other execution units, data caches, data address translation units, and other hardware threads may be selectively disabled, or alternatively, freed to handle other workloads. As a result, in many embodiments a general purpose processing unit may be provided with enhanced performance for specialized workloads such as DSP workloads with reduced power consumption, while also not sacrificing performance for non-DSP/general purpose workloads.

Therefore, consistent with one aspect of the invention, a circuit arrangement includes a processing unit including issue logic and an execution unit, the issue logic configured to issue instructions from at least one instruction stream to the execution unit, the execution unit including a register file within which is stored operand data, and the execution unit configured to execute the instructions issued to the execution unit by the issue logic, where at least a portion of the instructions executed by the execution unit manipulate the operand data stored in the register file. The circuit arrangement also includes control logic coupled to the execution unit and configured to utilize at least a portion of the register file as a local instruction loop buffer, where the control logic is configured to cause instructions stored in the register file of the execution unit to be executed by the execution unit.

Consistent with another aspect of the invention, a method of executing instructions in a processing unit of the type including an execution unit including a register file includes fetching a first plurality of instructions from an instruction stream; in response to at least one instruction from the instruction stream, causing the execution unit to manipulate operand data stored in the register file; in response to at least one instruction from the instruction stream, loading a second plurality of instructions into the register file of the execution unit to utilize at least a portion of the register file as a local instruction loop buffer; fetching the second plurality of instructions from the register file; and causing the execution unit to execute the second plurality of instructions fetched from the register file.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
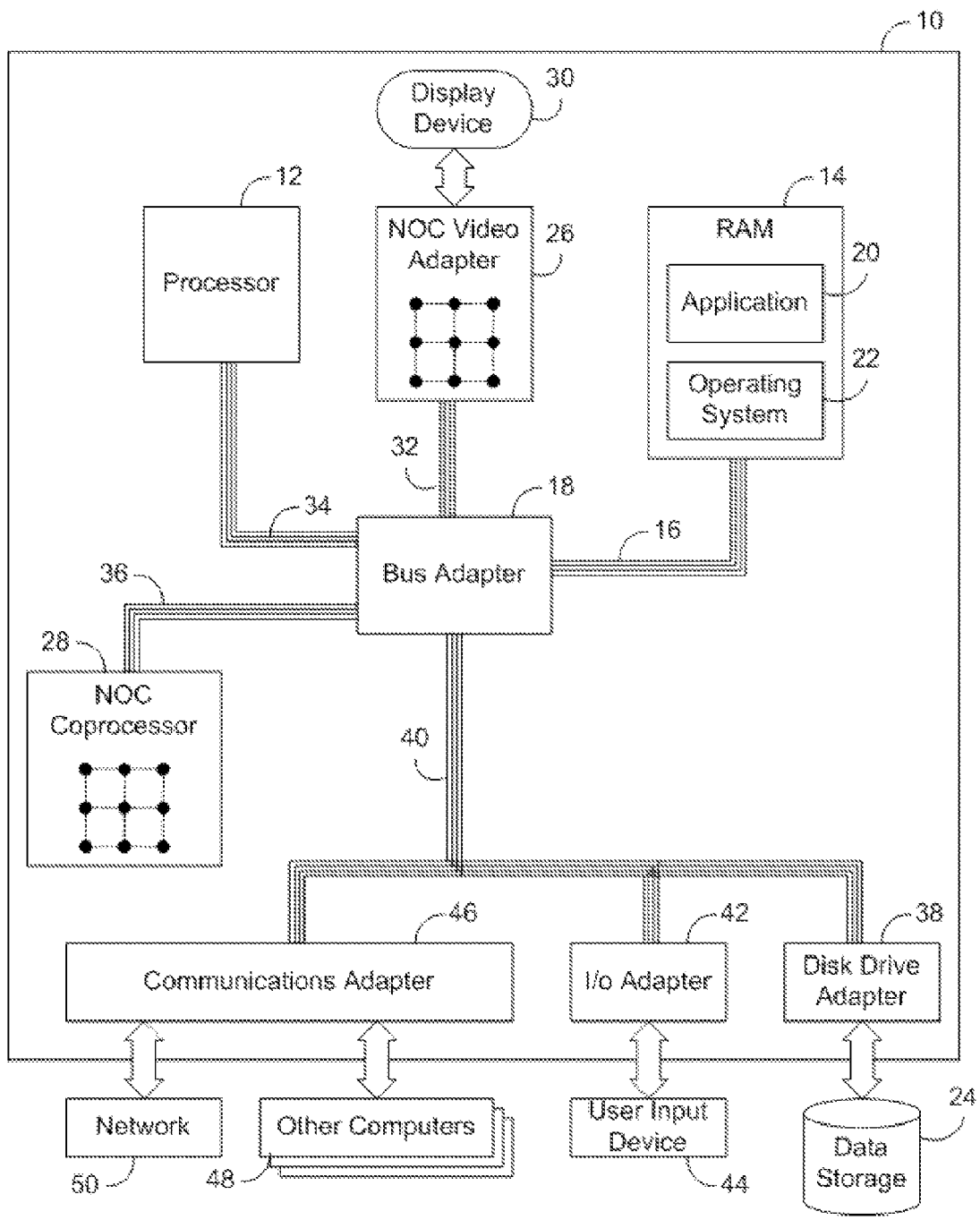
FIG. 1 is a block diagram of exemplary automated computing machinery including an exemplary computer useful in data processing consistent with embodiments of the present invention.

Embodiments consistent with the invention utilize a register file of an execution unit as a local instruction loop buffer to enable suitable algorithms to be performed directly and efficiently within the execution unit. By doing so, other logic circuits in a processing unit utilized for other, general purpose workloads may either be powered down or freed up to handle other workloads, thereby reducing power consumption and/or improving overall performance of a processing unit. In addition, the need for a separate, specialized execution unit may be avoided in some embodiments. For example, for DSP applications where DSP workloads may be required along with other, non-DSP/general purpose workloads, an execution unit may be configured to perform DSP algorithms using a local instruction loop buffer, thereby eliminating the need for a separate DSP accelerator or chip.

A local instruction loop buffer may be implemented, for example, in a general purpose processing unit, which within the context of the invention may include practically any type of processing unit, e.g., as disposed in an IP block, a processor chip, a processor core, etc., and capable of executing instructions to handle general purpose workloads. While a general purpose processing unit may include various components, execution units or accelerators that optimize or accelerate particular types of workloads, e.g., image processing, graphics, scientific workloads, transaction processing, etc., a general purpose processing unit is otherwise capable of handling multiple types of workloads, even if it does so sub-optimally as compared to a more specialized processing unit. In the least, a general purpose processing unit is capable of handling workloads other than the particular DSP workloads handled by DSP chips, DSP execution units, or other DSP-specific logic circuits.

A DSP workload relates to the performance of various types of DSP algorithms, which are characterized as algorithms that manipulate digital representations of signals, which in turn typically represent time-varying or spatially-varying physical quantities, including, for example, image processing, audio processing, and processing of sensor data, among other applications.

In addition, utilization of a local instruction loop buffer may enable other logic circuits, e.g., one or more functional units, to be disabled and/or powered down. A functional unit, within the context of the invention, may include an execution unit such as a fixed point execution unit (XU), a floating point execution unit (FPU), an auxiliary execution unit (AXU), or various types of accelerators or specialized execution units (e.g., encryption/decryption engines, DMA engines, compression/decompression engines, physics engines, graphics processors, coprocessors, etc.). In addition, a functional unit may include types of processor logic other than execution units or accelerators, e.g., caches, multithreading logic, pipeline stages, instances or components, memory management logic, address translation logic, interface logic, prediction logic, renaming logic, issue logic, decode logic, completion logic, etc.

Other variations and modifications will be apparent to one of ordinary skill in the art. Therefore, the invention is not limited to the specific implementations discussed herein.

Hardware and Software Environment

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™ Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
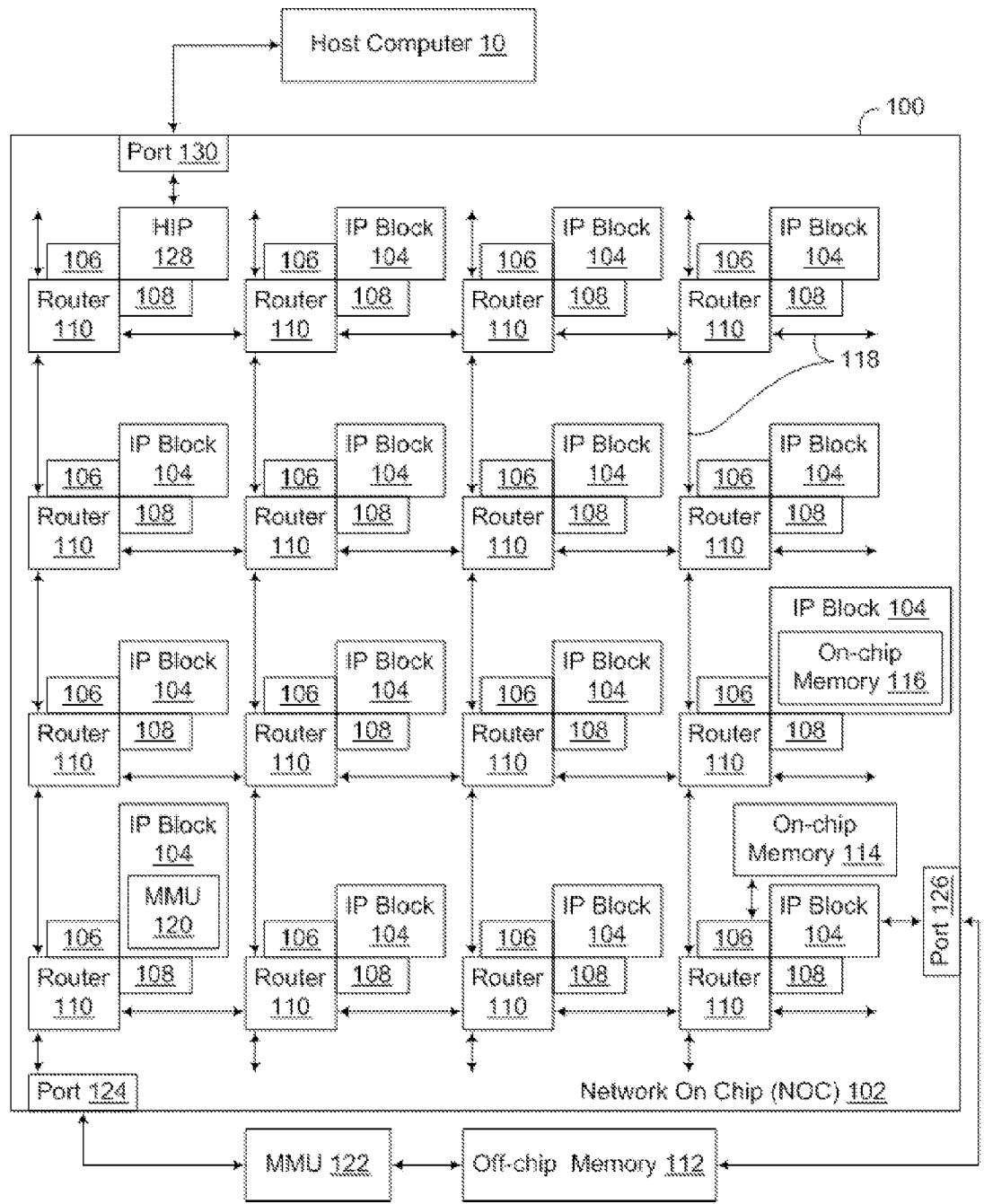
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
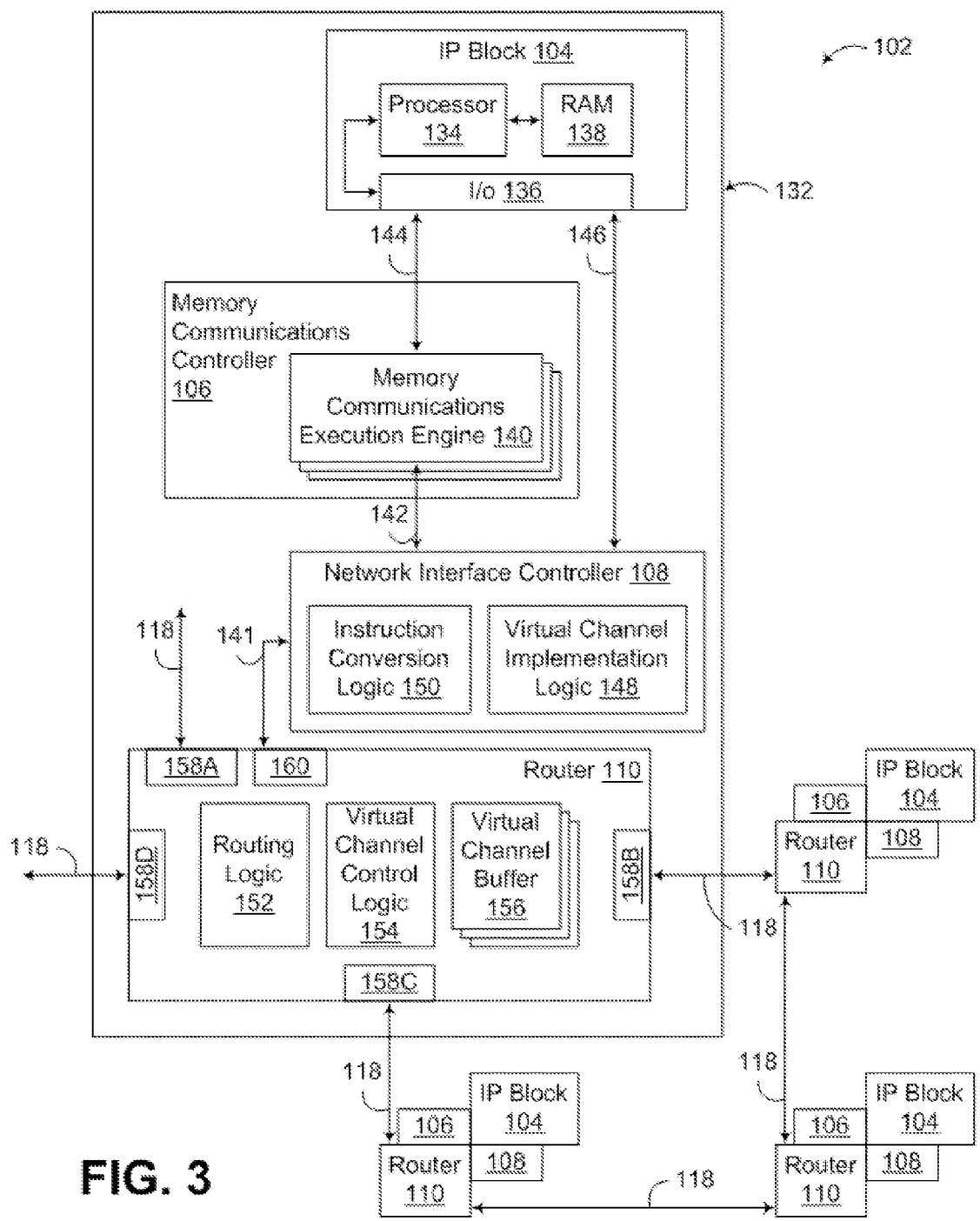
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block.

Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
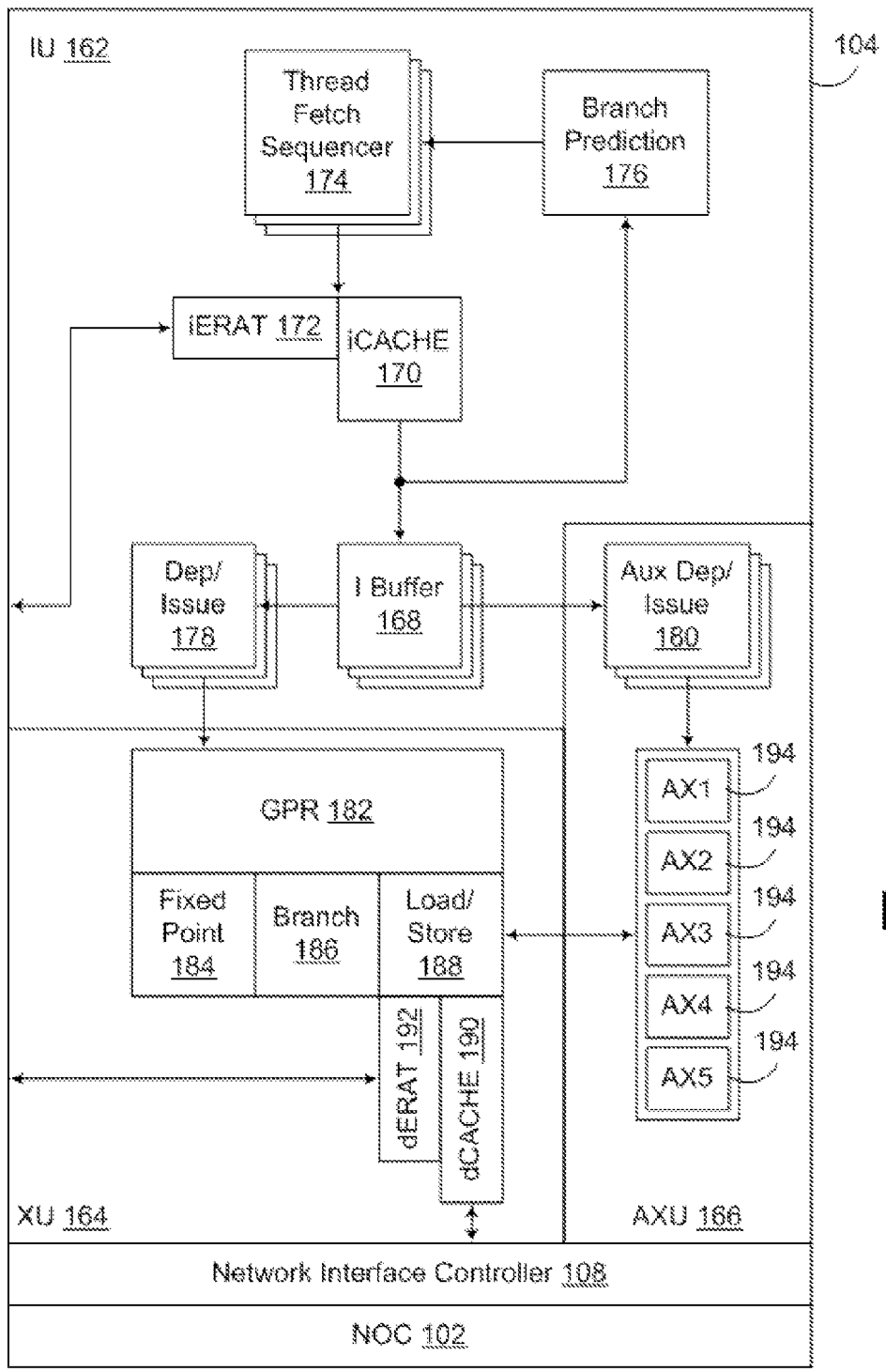
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an issue or instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Local Instruction Loop Buffer Utilizing Execution Unit Register File

Power consumption in modern System on Chip (SOC) designs has become a significant design constraint as more complex chips are developed and technologies shrink to allow for more logic per chip. The threshold has now been passed where it costs more power per bit to move the bit from memory to the CPU, than it does to perform the desired computation. Therefore, new power reduction mechanisms are needed for moving data around on, and off, chip. Additionally, many features once unique to digital signal processors (DSPs) are increasingly being implemented on general purpose processing units to reduce cost by eliminating the need for separate DSP chips in a system and to increase performance by eliminating the need to move data between the DSP chip and the CPU. Many DSP algorithms typically performed by DSP chips such as Fast Fourier Transforms (FFT) do not perform as well with traditional general purpose processing units, and although some features added to general purpose processing units such as single instruction multiple data (SIMD) execution units and predication have improved performance, the power consumption of processing units performing these algorithms is still much higher than that of DSP chips specifically tailored for those algorithms, often because general purpose processing units typically contain large blocks of logic such as the L1 data cache that are intended to improve performance generally for most workloads. However, for many DSP algorithms, this logic does very little to improve performance.

For example, many DSP algorithms follow a similar coding pattern, such as represented in Table I below:

TABLE I

DSP Algorithm Pseudocode

```
loop:
    addi counter, 1 # increment a counter
    load v0
    load v1
    load v2
    load v3
    load v4
    ... (load as much data as possible into regfile)
    vmath
    vmath
    vmath
    vmath
    ... (perform the algorithm)
    store v0
    store v1
    store v2
    store v3
    store v4
    ... (store the processed data out to memory)
    bc start counter # (loop)
```

DSP algorithms similar to the above typically benefit from large register files, to be able to fit as much data as possible locally. Additionally, the algorithms typically do not really benefit from an L1 data cache as all of the data is typically new data that is not reused after it is written back into the register file. When such an algorithm is performed in a general purpose processing unit, however, the data is still brought through the L1 data cache, which adds significantly to the power consumption of the processing unit when performing the algorithm.

Embodiments consistent with the invention, on the other hand, may add a relatively small amount of control logic to an existing general purpose processing unit design to implement a local instruction loop buffer within the register file of an execution unit to accelerate the performance of DSP and other specialized algorithms with reduced overhead in circuit logic outside of the execution unit, thereby enabling one or more functional units used in general purpose/non-DSP workloads but that are otherwise unnecessary for DSP workloads to be effectively disabled to reduce power consumption of the processing unit and/or to free such functional units to perform other workloads.

In the embodiments discussed hereinafter, for example, an AXU such as a floating point execution unit may be supplemented with several AXU instructions, a few special purpose registers, and the capability to fetch, decode, and execute instructions directly from the AXU register file rather than the existing instruction cache. This allows for other functional units in a processing unit to be powered down, of if needed for other workloads, allows for greater overall performance as the functional units are not utilized by the AXU instructions.

Figure 5:
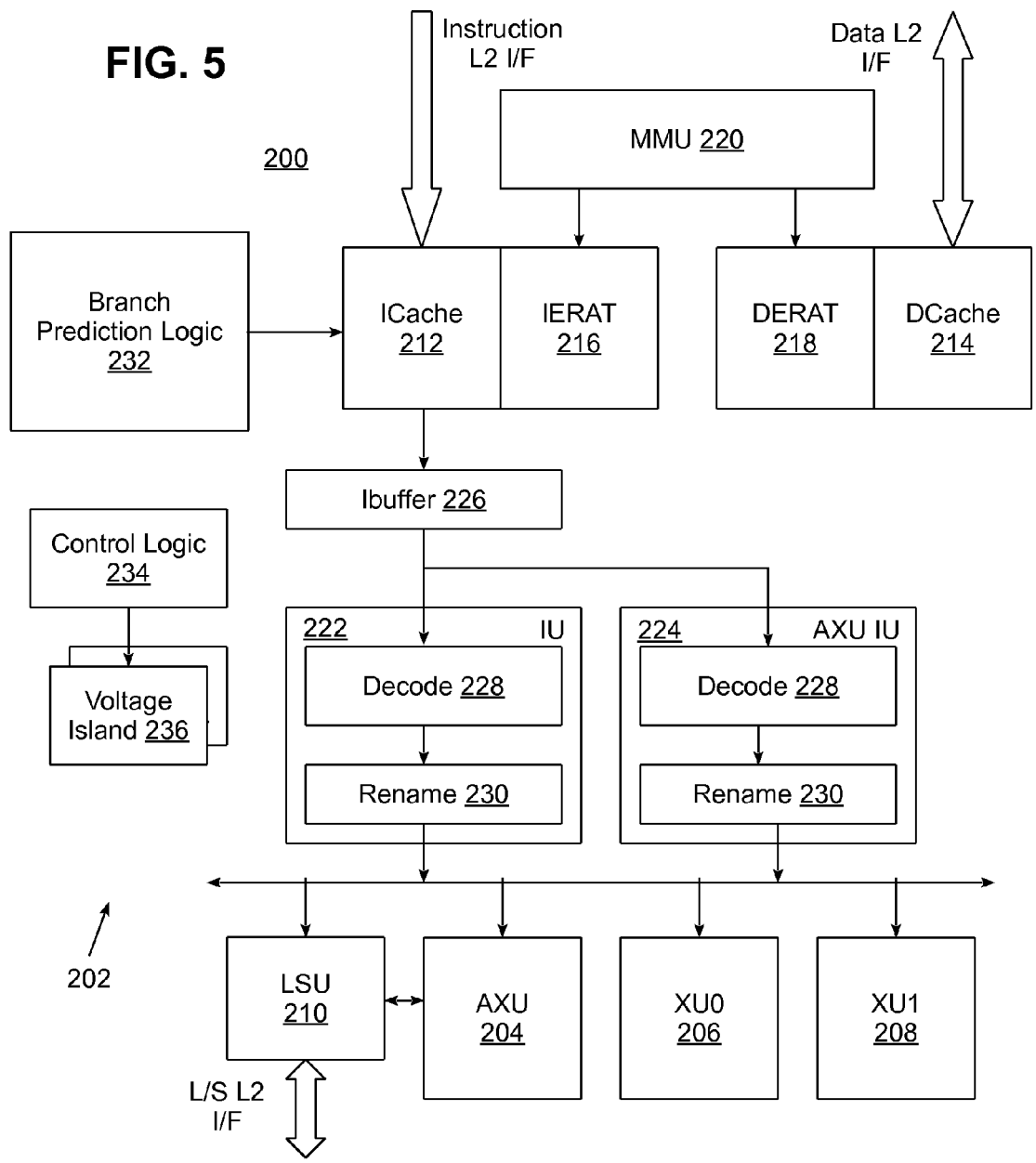
FIG. 5 is a block diagram illustrating an exemplary implementation of an IP block from the NOC of FIG. 2, and configured to implement a local instruction loop buffer in an execution unit consistent with the invention.

FIG. 5, for example, illustrates an example general purpose processing unit 200, which may be implemented, for example, as an IP block from the computer of FIGS. 1-4. General purpose processing unit 200 includes instruction logic 202 configured to supply instructions to one or more execution units, e.g., an auxiliary execution unit (AXU) 204 (implemented, for example, as a floating point execution unit), first and second fixed point execution units (XU0, XU1) 206, 208, and a load store unit (LSU) 210. An L1 cache is implemented as separate instruction (ICache) and data (DCache) caches 212, 214, each with a corresponding effective-to-real address translation (ERAT) unit 216, 218. A memory management unit (MMU) 220 controls the interface between the L1 and L2 caches.

Issue logic 202 in the illustrated embodiment is multithreaded to enable the concurrent execution of multiple instruction streams associated with multiple threads of execution. In addition, issue logic 202 may include separate logic, e.g., logic 222, 224, for fetching, decoding and issuing instructions for different execution units, and as such includes one instance 222 of issue logic components used to fetch, decode and issue instructions to the fixed point execution units and load/store unit 206-210, as well as a separate instance used to fetch, decode and issue instructions to AXU 204. Each instance 222, 224 fetches instructions from a shared instruction buffer 226, and processes the fetched instructions using dedicated decode logic 228 and rename logic 230. Branch prediction logic 232 is used to maintain historical information for a plurality of branch instructions and predict a code path to be followed subsequent to execution of such branch instructions.

In addition, in order to implement a local instruction loop buffer, additional control logic 234 is provided, and optionally having the capability, for example, to control the power to one or more voltage islands 236, e.g., to selectively disable and power down one or more functional units in general purpose processing unit 200. Additional functionality for control logic 234 will become more apparent from the discussion below.

It will be appreciated that a wide variety of alternate configurations may be utilized to that illustrated in FIG. 5. For example, various alternative issue logic configurations may be used, e.g., where various components or stages are combined for different execution units or threads of execution, rather than being implemented separately, or where additional and/or alternative components or stages are used. Different memory architectures and cache structures may be used in other embodiments, as may different numbers and combinations of execution units. Alternative control logic may be used to implement various types of power reduction methodologies (e.g., to clock gate certain logic rather than powering such logic down). In addition, processing unit 200 may be disposed within an IP block or a processor core that is integrated along with other IP blocks/processor cores on the same integrated circuit device, or alternatively, may be the only processing unit integrated on an integrated circuit device.

In general, embodiments consistent with the invention may be utilized in practically any general purpose processing unit configuration including an execution unit with a register file. Therefore, the invention is not limited to the particular implementations disclosed herein.

To implement a local instruction loop buffer, control logic 234 may be responsive to a dedicated instruction in an instruction stream being processed by processing unit 200 (e.g., a branch into AXU instruction, discussed in greater detail below), or alternatively, in response to a configuration or mode bit in a special purpose register in processing unit 200, which may be controlled via a write to the special purpose register.

In this embodiment, control logic 234 may disable a number of functional units that are unnecessary for executing a DSP or other specialized algorithm in AXU 204, e.g., one or both of execution units 206, 208, L1 DCache 214 and DERAT 218. In addition, in some embodiments, multithreading may be disabled. In other embodiments, however, no functional units may be disabled when executing an algorithm in AXU 204, and as such, other workloads that utilize such functional units may proceed in parallel with the algorithm executed in AXU 204.

Figure 6:
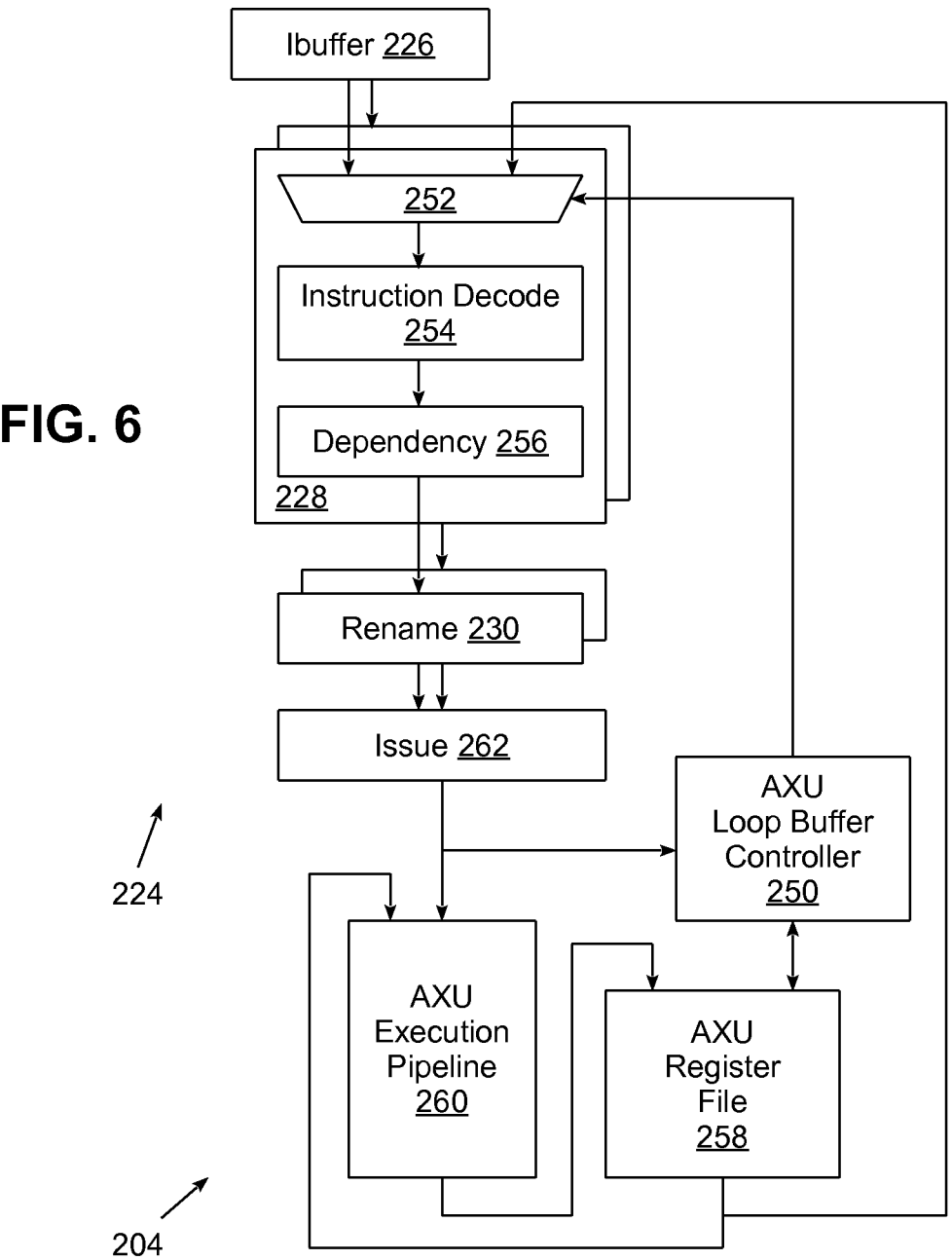
FIG. 6 is a block diagram of the auxiliary instruction and execution units referenced in FIG. 5.

Next, FIG. 6 illustrates one example implementation of control logic 234 for implementing a local instruction loop buffer in AXU 204. In particular, in this embodiment control logic 234 includes an AXU loop buffer controller 250 and selection logic 252, which may be implemented, for example, as a two input multiplexer.

Decode logic 228 of instance 224 is illustrated as including instruction decode logic 254 and dependency logic 256, and selection logic 252 is interposed between instruction buffer 226 and instruction decode logic 254. Selection logic includes a first input that receives instructions from instruction buffer 226 and a second input that receives instructions from an AXU register file 258 in AXU 204. Register file 258 also provides operand data stored in one or more registers to an AXU execution pipeline 260, and receives results of AXU operations back from AXU execution pipeline 260. Instructions received either from an instruction stream stored in instruction buffer 226 or from register file 258 are decoded by instruction decode logic 254, dependencies are tracked in dependency logic 256, and register renaming, if required, is performed by register rename logic 230 (logic 230 may be omitted in some embodiments). Instructions are then issued by issue unit 262 to execution pipeline 260, as well as to controller 250. In some instances, the dependency and rename logic may be more closely coupled than as shown in FIG. 6.

In some embodiments, AXU 204 is multithreaded, and as such, multiple thread-specific instances 228 may be provided, with issue unit 262 arbitrating between the multiple threads/instances. In other embodiments, however, AXU 204 may be single threaded.

Control logic 234 effectively implements a local instruction loop buffer in register file 258. In doing so, a portion of the registers/entries in register file 258 are used to store instructions to be fetched, decoded and executed by AXU 204, while another portion of the registers/entries in register file 258 are used to store data, e.g., operand data used as operands to instructions executed by AXU 204 and/or result data generated from the execution of such instructions.

To implement a local instruction loop buffer, one or more additional instructions may be added to the instruction set for the AXU, and supported by instruction decode logic 254. One such instruction is referred to herein as a "branch into AXU" instruction, which may, for example, optionally specify a particular register and/or word in register file 258 representing the start of a sequence of instructions stored in the register file. Another such instruction is referred to herein as a "branch out of AXU" instruction, which may specify a target address in a number of manners known in the art, e.g., via a link register, an offset, indirect addressing, etc.

Selection logic 252, as noted above, feeds AXU instruction decoder logic 254, and either takes as input instructions from AXU register file 258, or the existing instruction buffer 226/instruction cache 212 (FIG. 5). A mode signal, output by controller 250, controls selection logic 252, and may be accessed and controlled by a software-accessible special purpose register (SPR). The mode signal switches between an AXU register fetch mode, in which instructions are fetched from the local instruction loop buffer, and a regular mode, where instructions are fetched from instruction buffer 226. A "branch into AXU" instruction may activate the AXU register fetch mode for the thread, while a "branch out of AXU register" may put it back in the regular mode.

Controller 250 is configured to sequentially fetch new instructions from AXU register file 258 and manage fetches for AXU branches (i.e., taken v. non-taken). In this regard, control logic 234 may include a software accessible AXU loop counter and a loop address SPR for storing the AXU register file address (e.g., entry and word) of the head of the loop (i.e., the first instruction in a sequence of instructions). Alternatively, these registers may be written to in connection with execution of a branch into AXU instruction, with the loop count and/or AXU register file address provided as operands to the instruction.

The loop counter is decremented each iteration of the sequence of instructions, and whenever the loop counter is non-zero, a branch is taken back to the address stored in the loop address SPR. When the loop counter reaches zero, controller 250 may return the AXU to regular mode, thereby returning the AXU to fetching and executing instructions from instruction buffer 226.

It will be appreciated that various alternative hardware configurations may be used to implement a local instruction loop buffer consistent with the invention. For example, instructions stored in register file 258 may be decoded using separate decode logic from that used to decode the instructions stored in instruction buffer 226, and in some instances, the instructions stored in register file 258 may be formatted differently from other instructions in the instruction set used by the AXU, e.g., to conserve space in the register file, or to encode different, application-specific instructions.

In addition, it will be appreciated that practically any type of algorithm may be implemented in a local instruction loop buffer consistent with the invention. Moreover, depending upon how complex controller 250 is implemented, instruction sequences of varying complexity may be used in different embodiments. While in the illustrated embodiment only linear sequences of instructions are supported by controller 250, in other embodiments controller 250 may also include branch control logic to enable conditional branches to be provided in an instruction sequence and used to provide multiple code paths through the instruction sequence. It will also be appreciated that implementation of any of the aforementioned functionality within controller 250 would be well within the abilities of one of ordinary skill in the art having the benefit of the instant disclosure.

Figure 7:
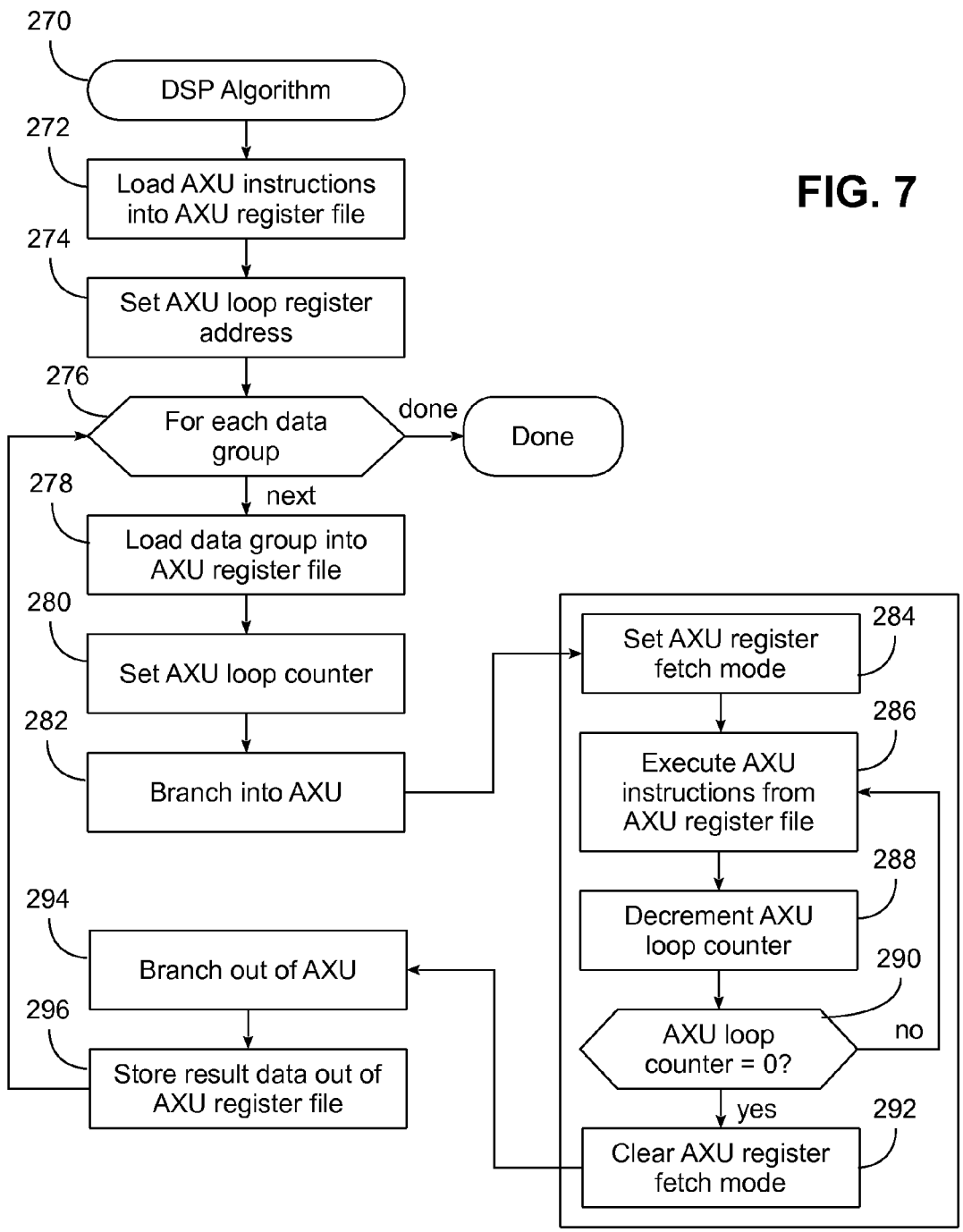
FIG. 7 is a flowchart illustrating an example sequence of operations used to implement a DSP algorithm using the IP block of FIG. 5.

Now turning to FIG. 7, an example DSP algorithm routine 270, used to perform a DSP or other specialized algorithm with the use of a local instruction loop buffer, is further illustrated. The left column of routine 270, in particular, represents the execution of an instruction stream, e.g., as may be provided in a software program and stored in a memory, cached in instruction cache 212 and executed by processing unit 200. The instruction stream in part sets up a local instruction loop buffer in AXU register file 258, stores an instruction sequence in the buffer/register file, loads operand data into AXU register file 258, triggers execution of the sequence of instructions stored in the buffer/register file by AXU 204, and writes out results to memory. The right column, in turn, represents the operations performed by AXU 204 in AXU fetch mode, e.g., as coordinated by controller 250.

Routine 270 begins in block 272 by loading a sequence of AXU instructions into the AXU register file, e.g., using conventional load instructions targeting the AXU register file. The instruction sequence may represent, for example, a specialized algorithm such as a DSP algorithm. For example, the instructions may be configured to perform all or a portion of a Fast Fourier Transform (FFT) calculation.

Next, in block 274, the AXU register file address, representing the start or head of the instruction sequence in the AXU register file, is stored in the loop address SPR, e.g., using a conventional write instruction to the loop address SPR.

Next, it is assumed for the purposes of this example that the amount of data to be processed by the instruction sequence is greater than can be stored in the AXU register file at the same time, such that the data must be processed in multiple data groups. Block 276 initiates a FOR loop to process each data group, and for each such data group block 278 loads the data group into the AXU register file, e.g., using conventional load instructions targeting the AXU register file. Block 280 then sets the number of iterations to perform, e.g., using a conventional write instruction to the AXU loop counter. Alternatively, this count could be set once, with the loop counter automatically restored to the initial count whenever the loop counter reaches zero. In addition, as noted above, the loop counter and/or the AXU register file address may be provided as operands to a branch into AXU instruction, eliminating the need for separate instructions to set either value.

Next, a branch into AXU instruction is executed in block 282. This instruction is decoded by instruction decode logic 254, which transfers control to controller 250 to enable the AXU register fetch mode for AXU 204 (block 284). Doing so causes controller 250 to control selection logic 252 to pass instructions from the instruction sequence stored in AXU register file 258 to instruction decode logic 254, resulting in execution of the instruction sequence stored in the AXU register file by AXU execution pipeline 260 in block 286. The AXU loop counter is then decremented in block 288, and if the counter is not zero, block 290 returns control to block 286 to perform another iteration of the instruction sequence. Once the loop counter reaches zero, however, block 290 passes control to block 292 to disable the AXU register fetch mode and return selection logic 252 to pass instructions from instruction buffer 226 to instruction decode logic 254.

The next instruction in the instruction stream is a branch out of AXU instruction (block 294), followed by block 296, in which one or more instructions write out the results of the calculations performed by the instruction sequence from the AXU register file to memory, or otherwise manipulate the result data (e.g., where each instruction sequence iteration calculates one or more partial sums, block 296 may simply sum the result data with a running sum). Control then returns to block 276 to process any additional data groups. Once all data groups have been processed, routine 270 is complete.

As illustrated in FIG. 7, the branch out of AXU instruction may be included in the instruction stream. Alternatively, the branch out of AXU instruction may be included in the instruction sequence and fetched from the AXU register file. As another alternative, no separate branch out of AXU instruction may be used, whereby clearing the AXU register fetch mode in block 292 may operate as an implied branch out of AXU instruction that returns control to the instruction stream to execute the next instruction after the branch into AXU instruction.

It will be appreciated that the instruction sequences stored in AXU register file and executed by the AXU will be application specific, and may include practically any sequence of instructions suitable for implementing a desired algorithm. Therefore, the invention is not limited to the particular implementation disclosed herein and illustrated in FIG. 7. In addition, while not shown in FIG. 7, it will be appreciated that while AXU 204 is in the AXU register fetch mode, controller 250 may disable one or more functional units in processing unit 200 to reduce power consumption of the processing unit.

The embodiments illustrated herein therefore allow for greater performance for a general purpose processing unit handling DSP and other specialized algorithms, and in many instances reducing power consumption when handling such algorithms, and while also not sacrificing performance for other, general purpose workloads, or requiring the need of a specialized execution unit.

Various additional modifications may be made to the disclosed embodiments without departing from the spirit and scope of the invention. Therefore, the invention lies in the claims hereinafter appended.

What is claimed is:

1. A method of executing instructions in a processing unit of the type including an execution unit including a register file, the method comprising:

fetching a first plurality of instructions from an instruction stream;

in response to at least one instruction from the instruction stream, causing the execution unit to manipulate operand data stored in the register file;

in response to at least one instruction from the instruction stream, loading a second plurality of instructions into the register file of the execution unit to utilize at least a portion of the register file as a local instruction loop buffer;

fetching the second plurality of instructions from the register file; and causing the execution unit to execute the second plurality of instructions fetched from the register file;

wherein the processing unit further comprises instruction decode logic and selection logic configured to pass instructions to the instruction decode logic, the selection logic including at least first and second inputs, the first input configured to receive instructions from an instruction cache and the second input configured to receive instructions from the register file, and wherein the method further comprises switching the selection logic to the second input prior to fetching the second plurality of instructions.

2. The method of claim 1, further comprising:

in response to at least one instruction from the instruction stream, storing a loop count value in a loop counter; and causing the execution unit to execute the second plurality of instructions for a plurality of iterations based upon the loop count value stored in the loop counter.

3. The method of claim 2, further comprising:

in response to at least one instruction from the instruction stream, storing a loop address in a loop address register that points to a first instruction among the second plurality of instructions in the register file; and branching to the first instruction at the end of the second plurality of instructions based upon the loop address register.

4. The method of claim 1, wherein the issue logic is configured to issue instructions associated with a plurality of threads to the execution unit, wherein the instruction decode logic is associated with a first thread among the plurality of threads, and wherein fetching the second plurality of instructions is performed concurrently with fetching instructions from a second instruction stream associated with a second thread among the plurality of threads.

5. The method of claim 1, wherein the instruction decode logic is configured to decode instructions from an instruction set associated with the execution unit, wherein the instruction set includes a first instruction configured to branch into the local instruction loop buffer and a second instruction configured to branch out of the local instruction loop buffer.

6. The method of claim 1, wherein the execution unit is selected from the group consisting of an auxiliary execution unit, a floating point execution unit, and a fixed point execution unit.

7. The method of claim 1, wherein the instructions stored in the register file implement a digital signal processing (DSP) algorithm.

8. The method of claim 1, further comprising disabling at least one functional unit in the processing unit when the execution unit is executing the second plurality of instructions to reduce power consumption of the processing unit.

* * * * *